United States Patent [19]

Melnick

[11] Patent Number: 4,726,241
[45] Date of Patent: Feb. 23, 1988

[54] CONTINUOUS FORCE AND IMPACT GENERATOR

[76] Inventor: Harry S. Melnick, 20281 E. Country Club Dr., North Miami Beach, Fla. 33180

[21] Appl. No.: 879,608

[22] Filed: Jun. 27, 1986

[51] Int. Cl.⁴ .............................................. F16H 19/06
[52] U.S. Cl. ...................................... 74/61; 74/84 R; 74/129; 74/812
[58] Field of Search ................. 74/61, 53, 54, 55, 812, 74/129, 84 R, 84 S; 180/7.1, 7.3

[56] References Cited
U.S. PATENT DOCUMENTS

| 4,242,918 | 1/1981 | Srogi | 74/84 S |
| 4,398,431 | 8/1983 | Melnick | 74/61 |
| 4,409,856 | 10/1983 | Weaver | 74/84 S X |

Primary Examiner—George H. Krizmanich
Attorney, Agent, or Firm—McCormick, Paulding & Huber

[57] ABSTRACT

A purely mechanical apparatus using a number of centrifugal force generating devices produces a unidirectional continuous centrifugal force on the main frame of the generator which is capable of propelling the generator in a straight line or of imposing a force on another body against which the generator may be placed.

15 Claims, 5 Drawing Figures

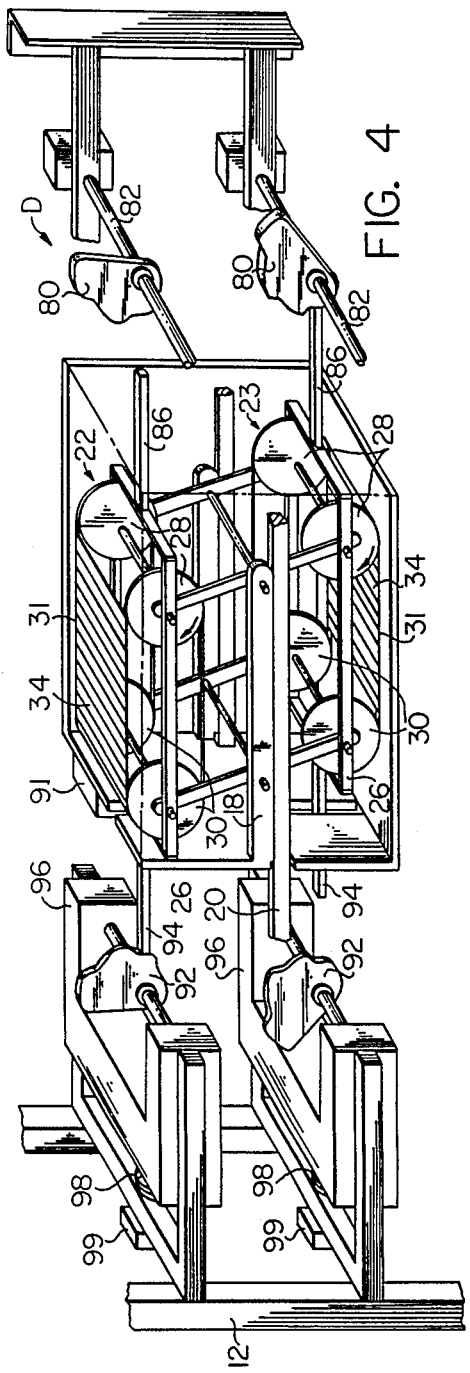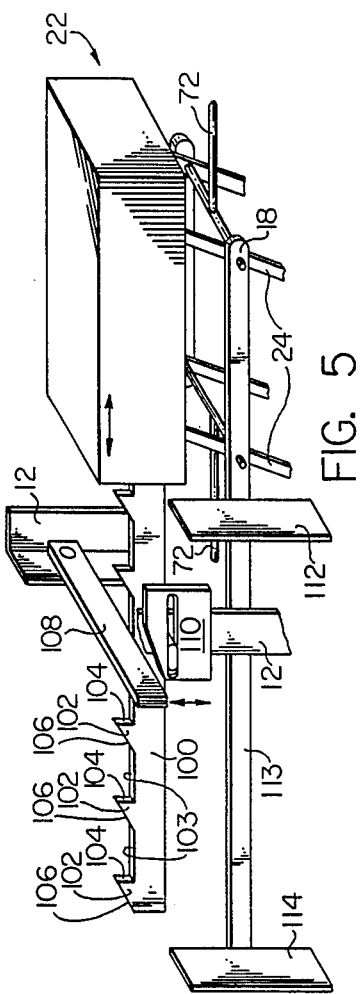

CONTINUOUS FORCE AND IMPACT GENERATOR

BACKGROUND OF THE INVENTION

This invention relates to a device for generating a continuous unidirectional force and, if desired, repetitive impact forces in the same direction as the continuous force, and deals more particularly with such a device which is purely mechanical in nature and may be driven by a source of rotary power such as an electric motor.

A device which can produce a unidirectional continuous force on itself has many conceivable applications, yet the only well known devices for generating such forces are rocket engines which have serious limitations for some applications. For example, it is difficult to turn rockets on and off or to otherwise modulate the strength of the generated forces and they require the burning of fuels or compression of gases which may be undesirable in some circumstances.

The general object of this invention is, therefore, to provide a device which produces a unidirectional force upon itself, much like the force generated by a rocket, and which uses a purely mechanical means for the force generation which means may be easily controlled to turn on or off or vary the strength of the generated force.

Another object of the invention is to provide a device of the forgoing character which may be constructed so as to also produce, in addition to a continuous unidirectional force, a repetitive series of impact forces superimposed on the continuous force as may, for example, be desirable when using the device as a pile driver or demolition device.

A further object of the invention is to provide a device of the foregoing character which is made up of a number of substantially identical single units which work in pairs to produce a continuous force and which may be grouped in a number of pairs working in different phases relative to one another to provide a more steady output force.

Other objects and advantages of the invention will be apparent from the drawings and from the following detailed description of the preferred embodiments.

The apparatus of the invention uses a number of centrifugal force generating devices of the weighted endless belt type shown and described in my U.S. Pat. No. 4,398,431.

SUMMARY OF THE INVENTION

The invention resides in a unidirectional force generator comprising a main frame and a mechanical means carried by the main frame which, when driven, exerts a substantially continuous force on the main frame tending to urge it in one direction so that if, for example, the device is located on earth and equipped with wheels for supporting it on a road or other flat surface, the generated force will cause the frame to move along the road in a straight line without the wheels being directly powered. That is, the device produces a unidirectional force similar to that produced by a rocket, but does so by purely mechanical means.

More specifically, the invention resides in the force generator in addition to the main frame including at least two carriages, supported from movement relative to the frame along parallel paths, and two endless belt centrifugal force generating devices associated with each carriage. The two centrifugal force generating devices of each carriage are so phased and so connected with the main frame that they produce a forwardly directed force on the main frame while their carriage moves rearwardly. As this carriage moves rearwardly, it pulls the other carriage forwardly until the first carriage reaches a rearward limit position relative to the main frame, and then the functions of the two carriages are reversed with the second carriage then moving rearwardly, exerting a forwardly directed force on the main frame and pulling the first carriage forwardly.

The invention also resides in the connection between each endless belt centrifugal force generating device and the main frame being such that as a forwardly directed force appears at a generating device a small amount of lost motion exists between that device and the main frame allowing the device to move forwardly relative to the main frame to create an impact force as its movement is arrested and to thereafter apply the forwardly directed force to the main frame.

The invention still more specifically resides in further details of the mechanism as recited in the appended claims.

BRIEF DESCRIPTION OF THE DRAWING

FIG. 4 is a perspective view of another single unit which may be substituted for each of the single units of the generator of FIG. 1 to produce yet another embodiment of the present invention.

FIG. 5 is a perspective schematic view showing an alternate mechanism for connecting a centrifugal force generating device to the main frame in a generator such as that in FIG. 1.

DESCRIPTION OF THE PREFERRED EMBODIMENTS

Figure 1:
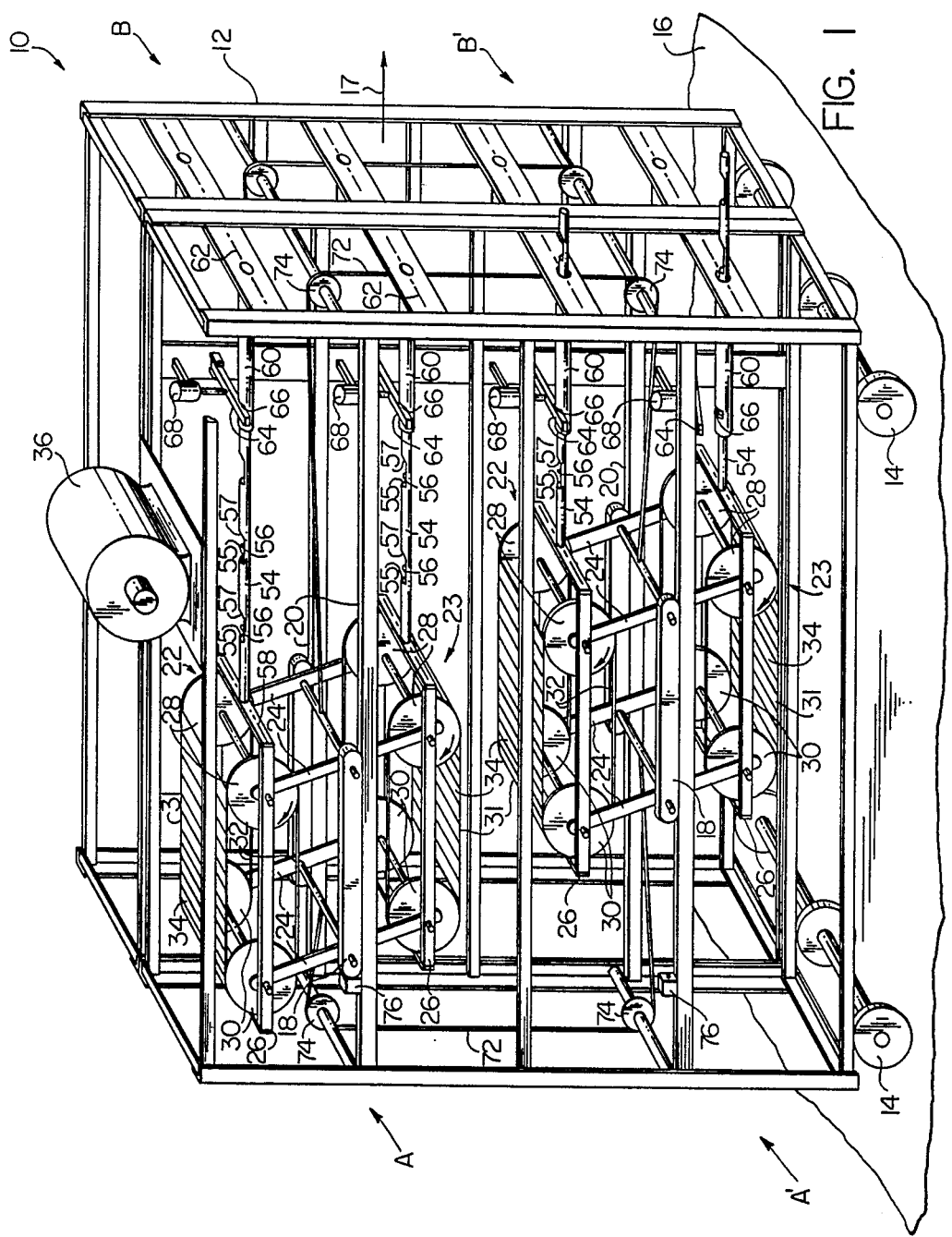
FIG. 1 a perspective schematic view showing a continuous force and impact generator embodying the present invention.

Turning to FIG. 1, a continuous force and impact generator embodying the invention is there indicated generally at 10 and comprises a main frame 12 supporting four individual units A, A' B and B'. In its simplest form a continuous force generator comprising the invention is made up of a pair of single units, such as the units A and A', but additional pairs of single units may be included in the device to produce a more steady and/or larger output force. The four unit device 10 of FIG. 1 is therefore illustrated by way of example only. Also, FIG. 1 shows only the internal details of the single units A and A'. The internal details of the units B and B' are similar to those of the units A and A' except for operating out of phase with the units A and A prime as explained in more detail hereinafter.

In FIG. 1 the generator 10 is shown to be mounted on a set of wheels 14, 14 supporting the generator on a flat floor 16. When the generator 10 is operating a fowardly directed force, as indicated by the arrow 17 is imposed on the main frame 12 which moves the generator forwardly or to the right in FIG. 1 over the floor 16 without the wheels 14, 14 being directly driven.

In the description and claims which follow, the generator 10 and other generators embodying the invention are described using relative terms such as "horizontal", "vertical", "top", "bottom", "right" and "left" with the generator taken to be oriented as in FIG. 1. Such orientation is not, however, essential to the invention and instead the generator may be oriented to cause the generated unidirectional force 17 to point in any desired direction. It is also, of course, not necessary to supply the generator with wheels in all applications and in some instances the apparatus may be merely connected to or placed against another body to apply a unidirectional force, or a unidirectional force and impacts to the body.

As shown in FIG. 1, each single unit A and A' includes a carriage 18 supported for movement along a horizontal path relative to the main frame 12. The means for supporting the carriage from the main frame may take various different forms but in the illustrated case each carriage is shown to be supported by two horizontal rails 20, 20 forming part of the main frame 12. Suitable wheels, not shown, may be provided on the carriage 18 for engagement with the rails 20, 20 to reduce friction between the carriage and the rails as the carriage moves forwardly and rearwardly over the rails. In FIG. 1 forward movement is taken to be movement toward the right, or in the direction of the arrow 17, and rearward movement is taken to be movement to the left.

Each carriage 18 supports two endless belt centrifugal force generating devices 22 and 23 which are connected to the carriage and to one another so as to be moveable generally forwardly and rearwardly relative to the carriage and so as to be constrained to movement 180° out of phase with one another so that as one moves forwardly the other moves rearwardly. In the illustrated case the means so connecting the devices 22 and 23 to the carriage 18 consists of four links 24,24 pivotally connected at their mid-points to the carriage 18 so as to provide four upwardly extending arms supporting the device 22 at their upper ends and four down extending arms supporting the device 23 at their lower ends. Each device 22 and 23 includes a frame 26 pivotally connected to the adjacent ends of the links 24,24. Each frame 26 in turn supports two forward sprockets 28,28 and two rearward sprockets 30,30 with the four sprockets together supporting a weighted endless belt 31 comprised of two endless chains 32 and a number of weights 34,34 attached to the chains along a portion of the length thereof. Each device 22 and 23 is therefore generally similar to the ones shown in my U.S. Pat. No. 4,398,431 to which reference may be made for further details.

The weights 34,34 of each device 22 and 23 are located along approximately 50% of the length of each endless belt. Therefore, as the weights of a belt pass over the associated forward sprockets 22 a prolonged forwardly directed centrifugal force is produced which is exerted against the associated frame 26, and as the same weights thereafter pass over the rearward sprockets 30,30 they generate a rearwardly directed prolonged force also applied against the frame 26. The weights of the two devices 22 and 23 of each carriage 18 are phased as shown in FIG. 1 so as to produce centrifugal forces at the two devices 22 and 23 which are 180° out of phase with one another. That is, as the weights 34,34 of one device pass over the forward sprockets 28,28 to create a forwardly directed force the weights of the other device pass over the rear sprockets 30,30 to produce a rearwardly directed force. Preferably, and as illustrated by the arrows in FIG. 1, the two belts of the two generators 22 and 23 of each carriage 18 rotate in the same direction.

Figure 2:
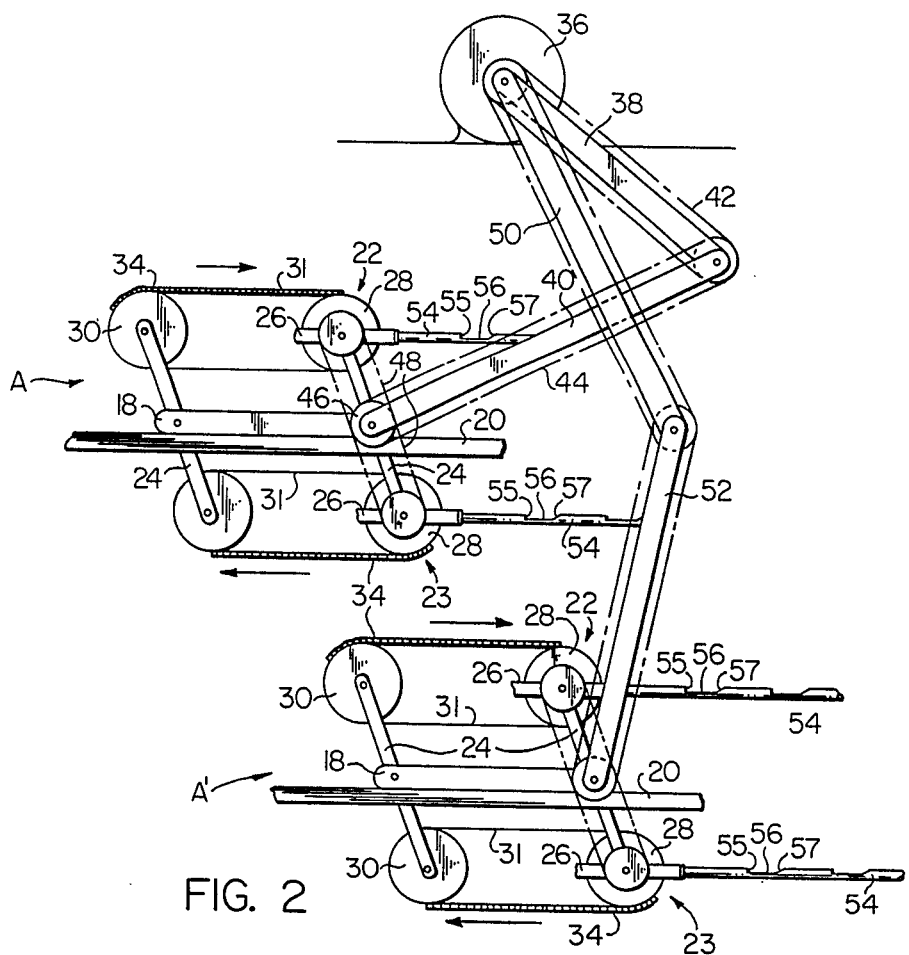
FIG. 2 is a schematic diagram illustrating the drive mechanism for the generator of FIG. 1.

Suitable means are provided for driving the two endless belts of the two devices 22, 23 of each carriage while maintaining their phase relationship, while permitting the links 24,24 to oscillate relative to the carriage 18 and while permitting the carriage 18 to move forwardly and rearwardly relative to the main frame 12. Various suitable means may be provided to achieve such a drive and a showing of the drive means is omitted in FIG. 1 for clarity. FIG. 2, however, shows schematically a drive which may be used with the single units A and A' of FIG. 1 and a similar drive powered by the same electric motor may also be used to drive the single units B and B' of FIG. 1.

Figure 3:
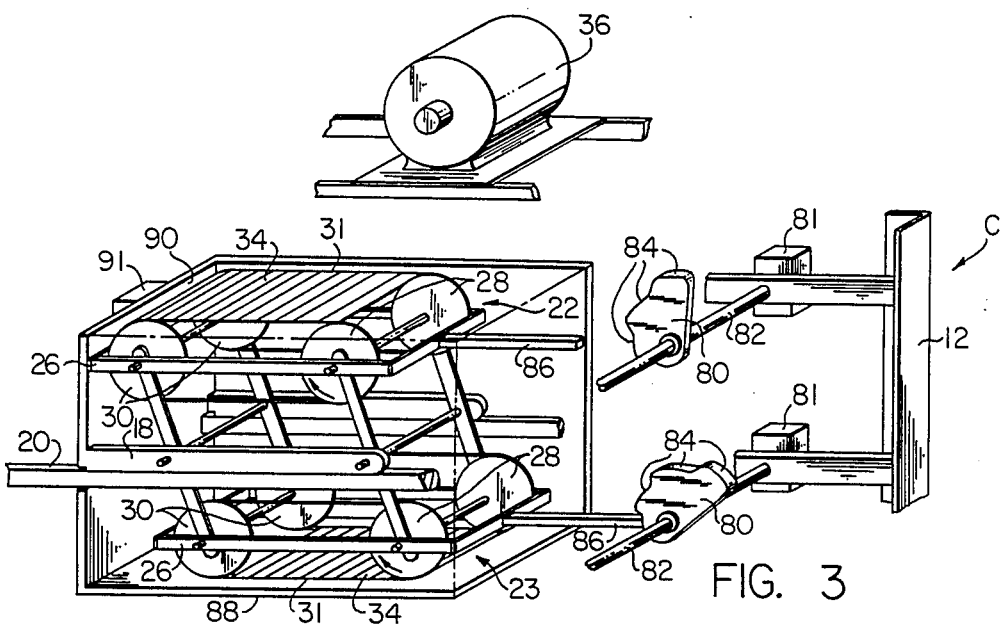
FIG. 3 is a perspective view of a single unit which may be substituted for each of the single units of the generator of FIG. 1 to produce another embodiment of the present invention.

Referring to FIG. 2, the drive for each carriage 18 uses an articulated pair of arms, similar to that of FIG. 3 of my U.S. Pat. No. 4,398,431, for transmitting power from an electric motor 36 attached to the main frame 12 to the carriage 18. That is, for the carriage 18 of the single unit A the drive train includes two articulated arms 38 and 40 carrying respectively drive chains 42 and 44 transmitting rotary power from the motor 36 to a set of pulleys 46,46 on the carriage 18 which in turn by means of two endless chains 48,48 transmit power to the two forward sprockets 28,28 of each device 22 and 23 to drive the endless belts 31,31. Likewise, for the illustrated single unit A' of FIG. 2 the drive train includes a pair of articulated arms 50 and 52 connected between the motor 36 and the carriage 18 and carrying a similar complement of chains and sprockets for transmitting the rotary output of the motor 26 to the two associated endless belts 31,31.

Returning to FIG. 1, when the two centrifugal force generating devices 22 and 23 of a carriage are driven the alternating and repetitive forward and rearward centrifugal forces produced by the two devices, and which are 180° out of phase with one another, will cause the two devices 22 and 23 to oscillate forwardly and rearwardly relative to the carriage 18 without imposing any force on the carriage 18 tending to move the carriage in either direction horizontally of the main frame 12. Thus, under this condition, referred to as the "free" mode of operation, the carriage 18 may be freely moved by some other force either forwardly or rearwardly relative to the frame. Also, if desired, in another type of "free" mode operation the frames 26,26 of the two devices 22 and 23 may be locked to their carriage 18 in which case the forwardly and rearwardly generated centrifugal forces produced by the two devices will cancel one another and produce no resulting force on the carriage tending to move it horizontally relative to the main frame, the carriage 18 again being capable of being moved freely relative to the main frame by some other force applied to it. This ability to move a carriage 18 freely relative to the main frame 12, either while the devices are allowed to freely oscillate or are locked to its carriage 18, is made use of in the overall operation of the generator 10 as explained in more detail below.

Each carriage 18 has two modes of operation. The first mode of operation is the "free" mode described above where the two devices 22 and 23 of the carriage are unconnected with the main frame so that no net resultant centrifugal force is applied to the carriage tending to move it in one direction or another relative to the main frame. The other mode of operation I, referred to as the "power" mode, is one in which the two devices 22 and 23 of the carriage are so connected or associated with the main frame 12 that when a forwardly directed centrifugal force appears at a device the forward movement of that device is arrested or limited so that the forwardly directed centrifugal force is applied to the main frame to urge it forwardly, and that when a rearwardly directed centrifugal force appears at a device the device is free to move rearwardly relative to the main frame so as to exert no centrifugal force on the frame.

Various different means may be used to achieve the "power" mode of operation of each carriage. Referring to FIG. 1, such means as illustrated there comprises for each device 22 or 23 a generally horizontal rod 54 provided with a series of notches 56,56 and pivotally connected at its rear end to the forward end of the associated frame 26 for pivotal movement relative to that frame about a horizontal axis 58. The forward end of the rod is slidably received in a section of pipe 60 pivotally connected to the main frame 12 for movement relative to that frame about a horizontal axis 62. Associated with each pipe section 60 is a latch 64 pivotally connected at one end to the main frame 12 and receivable in a notch 66 formed in the upper portion of the pipe section and which also allows the latch 64 to enter a notch 56 of the rod 54 which is in alignment with the pipe notch 66. The latch 64 is normally biased downwardly by its own weight, and also possibly by an assisting spring (not shown), into the notch 66 but may be lifted upwardly out of the notch 66 by an associated solenoid 68.

Operation of a single unit in its power mode may be obtained with the mechanism of FIG. 1 by controllably energizing the two associated solenoids 68,68 in synchronism with the movement of the carriage 18. Assume that the carriage 18 in question is that of the unit A' of FIG. 1 and, as shown, is positioned far to the right relative to the main frame 12. At this time the other carriage 18 (the unit A carriage) is positioned far to the left and trips a limit switch 76, as described hereinafter. This de-energizes the two solenoids associated with the carriage 18 of the unit A'. Also assume that now the weights 34,34 of the top device 22 are just beginning to pass over the front sprockets 28,28 of that device so as to begin the appearance of a prolonged forwardly directed centrifugal force. Since the solenoid 68 associated with the top device 22 of the unit A' is now de-energized the associated latch 64 is received in its pipe notch 66 and in the underlying one of the notches 56,56 in the rod 54. The appearance of the forwardly directed centrifugal force causes that force to be transferred to the rod 54 moving it forwardly until the vertical rear face 55 of the notch 56 within which the latch 64 is received engages the latch 64, and this in turn causes the force to be transmitted through the latch 64 and pipe section 60 to the frame 12 to impose the force on the frame 12 tending to move or urge it in the forward direction.

It will be noted in this regard that as the devices 22 and 23 of the unit A' oscillate relative to their carriage 18 the amount of oscillation from cycle to cycle is fairly uniform, and further each notch 56 is somewhat longer than the thickness of the latch 64 and has its rear face located so that after the latch enters the notch, and after the device reaches the rear limit of its movement, some looseness will exist in the permitted forward motion of the frame 26 of the device 22 relative to the pipe section 60 and frame 12—that is, the rear face 55 of the notch in which the latch is located will be located rearwardly of the latch. Accordingly, at the beginning of the appearance of the forwardly directed centrifugal force the carriage 26 will move forwardly some small distance relative to the frame 12 before the rear face 55 of the involved notch 56 engages the latch 64, thereby causing an impact force to be delivered to the frame when the forward movement becomes arrested by the latch. The extent or degree of such impact force may be varied by varying the position of the notch faces 55,55 on the rod 54. If desired, the notch faces 55,55 may also be located so that very little lost motion exists between the rod 54 and the pipe 60 when the device reaches the rear limit of its movement relative to the carriage 18 so as to produce little or no impact force each time a forwardly directed centrifugal force appears.

While the forwardly directed centrifugal force of the top device 22 of that unit A' is applied to the main frame 12 the bottom device 23 of that unit is free to move rearwardly relative to the frame 12 without imposing any centrifugal force on it. This is due to the fact of each notch 56 having an inclined forward face 57 which lifts the latch out of its notch when the associated rod 54 moves rearwardly. Therefore, the lower device 23, which will now have a rearwardly directed centrifugal force appearing at it, will move rearwardly under the influence of that force and will also move the associated carriage 18 of the unit A' rearwardly relative to the main frame 12 by a corresponding amount. That is, the carriage 18 will move rearwardly by an amount equal to one half the amount of the rearward movement of the device 23. Thereafter, the weights of the two endless belts of the two devices 22 and 23 of the unit A' will move over the opposite sprockets of each device to produce oppositely directed centrifugal forces. That is, a rearwardly directed centrifugal force will appear at the top device 22 and a forwardly directed centrifugal force will appear at the bottom device 23. Thus, the now forwardly directed centrifugal force appearing at the bottom device 23 of the unit A' will tend to move its rod 54 forwardly, but such motion will be arrested after a limited amount of forward motion and the generation of some impact force so that the subsequently appearing centrifugal force will be transmitted through the latch 64 and pipe section 60 cause it to appear as a forwardly directed centrifugal force exerted on the frame 12. At the same time, the top device 22 of the unit A' moves rearwardly taking with it by a corresponding amount the carriage 18.

Thus, it will be understood that when the two solenoids 68,68 associated with either the carriage 18 of the unit A or the carriage 18 of the unit A' are de-energized, the carriage with which the two de-energized solenoids are associated is caused to move rearwardly relative to the main frame 12 with the two devices 22 and 23 of that carriage at alternate times throughout such movement applying a forwardly directed centrifugal force on the main frame 12, the resultant force being substantially continuous due to the illustrated arrangement of the weights 34,34 on the two belts. This mode of operation of a carriage is its "power" mode. If desired, a single solenoid operating the two latches of a carriage in unison may also be used in place of the two separate solenoids operating each latch separately.

As mentioned, the generator 10 is such that its single units A, A' and B, B' work in pairs, and in each pair the arrangement is such that when one unit of the pair has its carriage operating in its "free" mode the carriage 18 of the other unit has its carriage operating in the "power" mode. Further, the two carriages of the two units of the pair are connected together so as to move in unison relative to the main frame 12 but 180° out of phase so that as one carriage 18 moves rearwardly in its "power" mode it pulls the other carriage, which is then in its "free" mode, forwardly relative to the main frame. In FIG. 1 the means for causing the two carriages 18,18 of the units A and A' to move in unison is shown to consist of two cables 72,72 connected between the two carriages through a set of pulleys 74,74 carried by the main frame, but various other means for achieving this motion can be used without departing from the invention.

Also, a means is provided for switching the carriages of a pair between their two modes of operation when one of the carriages reaches a rear limit position relative to the frame 12. Such means may take various different forms but in the illustrated case of FIG. 1 includes a limit switch 76 for each carriage 18 adapted to be operated by that carriage when the carriage reaches its rear limit position. Assume, for example, in FIG. 1 that the top carriage 18 at the moment illustrated is moving rearwardly, or to the left, in its power mode. This means that it is at the same time pulling the lower carriage 18, in its free mode, forwardly. To achieve this free mode of the lower carriage 18, the two solenoids 68,68 associated with it are energized to lift the two associated latches 64,64 so that both of the devices 22 and 23 of the lower device are free to move relative to the main frame without imposing any forces on it. When the top carriage reaches the limit switch 76 the operation of that switch causes the modes to reverse. That is, the two solenoids 68,68 of the top carriage 18 are energized to lift the two associated latches 64,64 and the two solenoids 68,68 of the bottom carriage 18 are de-energized. The lower carriage 18 will then move rearwardly in its power mode and pull forwardly the top carriage 18 which is now in its free mode. This procedure of switching the modes of the carriages as one carriage reaches its rear limit will continue for so long as the generator 10 is in operation and throughout all of such periods of operation a forwardly directed centrifugal force will be applied to the main frame 12 along with repetitive impact forces if the notches 56,56 of the rods 54,54 are designed to provide such impact forces.

The single units B and B' of the generator 10 of FIG. 1 operate in the same way as the single units A and A' described above except that the motions of their carriages are out of phase with the motions of the two carriages 18,18 of the units A and A' thereby causing a more steady forwardly directed force to be exerted on the main frame than would be generated by the single units A and A' acting alone, this smoothing of the resultant force being generally similar to the smoothing of the output of a piston engine by adding additional pistons working at different phases.

FIG. 3 shows a single unit C which may be substituted for the single units of the generator 10 of FIG. 1 and which single unit differs basically from the illustrated single units of FIG. 1 by having a different means for arresting the forward movement of a centrifugal force generating device, in its "power" mode of operation, relative to the main frame during the appearance at it of a forwardly directed centrifugal force. Referring to FIG. 3 the means in question in this case consists of, for each device 22 and 23, an impact cam 80 located in front of the device and supported by the main frame 12. Each cam 80 is carried by an associated shaft 82 which is driven by the motor 36 in sychronism with the motion of the two endless belts 31,31 through an indexing mechanism 81 such as a Geneva drive. Each cam 80 has a set of impact faces 84,84 arranged at progressively increasing distances from its shaft 82. When the illustrated carriage is in its power mode, the two cams 80,80 are turned generally as illustrated so as to be engaged by rams 86,86 on the forward ends of their associated devices 22 and 23 during the forward strokes of each device. During the reverse stroke of each device the associated cam is rotated to bring the next successive impact face into alignment with the ram 86 on the forward end of that device. The impact faces 84,84 of the two cams 80 are located along approximately 180° of rotation of each cam. During the other 180° of rotation each cam has no impact faces and the associated carriage 18 is in its free mode and is moved forwardly as described above to bring it into position for a new period of power mode operation. If desired, instead of the cams 80,80 being moved with an indexing motion they may also be driven continuously from the motor 36 and at such a speed that during the power mode a new impact force 84 appears in front of a device 22 or 23 each time it makes a new forward motion relative to the carriage 18.

Another difference in the single unit C of FIG. 3 in comparison to those shown by FIG. 1 is that the illustrated carriage 18 includes a housing 88 which contains the two centrifugal force generating devices 22 and 23. The rear wall 90 of this housing 88 is so located that during normal reciprocation of the two devices 22 and 23 they will not engage the rear wall 90, but should for some reason the reciprocation become abnormally large, as for example because of the associated latch 64 skipping one of its notches 56, the rearwardly moving one of the devices will engage the rear wall 90 to limit the reciprocation or stroke of the two devices, thereby preventing the devices from moving out of phase with other components. Also, a lock 91 is carried by its rear wall 90 which is released during operation of its associated carriage 18 in its power mode and which during the free mode of the carriage is operated to lock the devices 22 and 23 against movement relative to the carriage.

FIG. 4 shows another single unit D which may be substituted for the single units of FIG. 1 and which unit is substantially similar to that shown by FIG. 3 except for additionally including two other impact cams 92,92 located respectively to the rear of the two centrifugal force generating devices 22 and 23 and, moving generally in phase with the forward impact cams 80,80. That is, for example, when the top generator 22 is moved forwardly by a forwardly directed centrifugal force into engagement with the forward cam 80 the associated rear cam 92 is indexed one position to bring the next successive impact face into alignment with a rear ram 94 for engagement with that ram when the top device 22 again moves rearwardly, and as that device moves rearwardly the associated forward cam 80 is indexed to the next position for readiness when the device 22 next moves forwardly again. The two impact cams 80 and 92 of the lower device 23 operate in a similar manner.

The two rear impact cams 92,92 of the single unit D of FIG. 4 are carried by two weights 96,96 slidably connected through springs 98,98 to the main frame 12 for movement forwardly and rearwardly relative to the main frame. An adjustable device 99 is associated with each set of springs 98 and associated weight 96 to fine tune the generator by adjusting the preload of the springs relative to the weights and by adjusting the position of the weights and springs relative to the main frame to adjust the position at which the associated device engages the weight. The effect of each weight 96 and its associated springs 98 is that when the associated centrifugal force generating device moves rearwardly into engagement with the cam 92 the weight 96 stops the rearward motion of the device and absorbs, through the associated springs 98 and the mass of the weights, some of the generated force which is then returned to the device as it next moves forwardly again.

FIG. 5 shows an alternate means, which is purely mechanical, for connecting each centrifugal force generating device 22 or 23 to the main frame 12 to achieve operation of its carriage 18 in the power mode as its carriage moves forwardly (to the right). Referring to this figure, the illustrated means comprises a bar 100 extending rearwardly from the device 22 and having ratchet teeth 102,102 spaced along its length and notches 103,103 between the teeth, each tooth 102 having a forwardly facing vertical abutment face 104 and a rear inclined face 106. A latch 108 pivotally connected to the main frame 12 cooperates with the bar and is biased by its weight, and also possibly by an assisting spring (not shown), toward engagement with the bar. A latch controlling slide 110 is slidably supported on the frame 12 for limited forward and rearward motion. In its illustrated forward position the slide is out of engagement with the latch, thereby allowing the latch to engage and cooperate with the bar 100. When the slide is moved rearwardly from its illustrated position the inclined surface on its rear portion lifts the latch 108 out of cooperation with the bar. An abutment 112 on the carriage is engageable with the slide, and also simultaneously with the slide for the associated bottom device 23 (not shown), to move it from its forward to its rear position as the carriage 18 reaches the rear limit of its movement relative to the frame 12. Another abutment 114, which is fixed to the carriage 18 by a rearwardly extending bar 113, moves the slide 110, and also simultaneously the slide for the associated bottom device 23 (not shown), from its rear to its forward position as the carriage reaches the forward limit of its movement relative to the frame. It will therefore be understood that when the carriage 18 reaches its rear limit the two latches 108 of the two devices of the carriage are lifted to put the carriage into its free mode, during which time the carriage is pulled forwardly to its forward limit; and when the forward limit is reached the latches are lowered to put the carriage into its power mode during which it moves itself rearwardly and pulls the other carriage forwardly.

The illustrated centrifugal force generating devices have been shown by way of example only and various other different devices may be used in a continuous force generator of the type described above without departing from the invention. In particular, if desired, each illustrated single belt generating device may be replaced by a device employing two counterrotating belts, as in my U.S. Pat. No. 4,398,431.

I claim:

1. A unidirectional force generator comprising:
a main frame,
two carriages supported for movement relative to said main frame along paths extending parallel to a given reference axis, movement in one direction parallel to said reference axis being taken as forward motion and movement in the opposite direction parallel to said reference axis being taken as rearward motion,
two centrifugal force generating devices associated with each of said carriages and each constructed and arranged so as to produce a centrifugal force which repetitively alternates between forward and rearward directions parallel to said reference axis, said two centrifugal force generating devices being substantially 180° out of phase with each other so that as one produces a forwardly directed centrifugal force the other produces a rearwardly directed centrifugal force,
means for connecting said two centrifugal force generating devices associated with each carriage to that carriage in such a way that each device is moveable relative to the carriage along a path generally parallel to said reference axis and so that said two devices are constrained to move in unison substantially 180° out of phase with each other so that as one moves forwardly relative to the carriage the other moves rearwardly relative to the carriage,
control means for controlling the movement of the two centrifugal force generating devices of each carriage relative to said main frame so as to operate in either a free mode or a power mode, said control means in said free mode permitting the two centrifugal force generating devices of the associated carriage to move unrestrictedly relative to said main frame so that no force is imposed on said carriage tending to move it in either direction along its path of travel relative to said frame, and said control means in said power mode each time a forwardly directed centrifugal force appears at either one of said devices restricting the forward movement of that device relative to said frame so that when a forwardly directed centrifugal force appears the one of said devices creating said force will exert a forwardly directed force on said main frame with the other one of said centrifugal force generating devices and the carriage itself moving rearwardly relative to said main frame,
means interconnecting said two carriages for movement in unison so that when one of said carriages moves rearwardly relative to said main frame the other moves forwardly, and
means for regulating said control means of both of said carriages so that its centrifugal force generating devices of one carriage will remain in said free mode and the centrifugal force generating devices of the other of said carriages will remain in said power mode until said other carriage reaches a rearward limit position relative to said frame and so that when said other carriage reaches said rearward limit the operational modes of the centrifugal force generating devices of said two carriages are reversed.

2. A unidirectional force generator as defined in claim 1 further characterized by said control means being such that each time a forwardly directed centrifugal force appears at either one of the two centrifugal force generating devices of a carriage the forward movement of that device producing the forwardly directed force is restricted to a distance many times smaller than the length of said path of movement of said carriage relative to said main frame but permitting some forward movement of that device so that during the initial phase of the appearance of said forwardly directed force that the device will move forwardly relative to said frame a small amount until an impact is produced when said device reaches the limit of such permitted movement and so that said device will thereafter exert said forwardly directed force on said main frame.

3. A unidirectional force generator as defined in claim 1 further characterized by each of said centrifugal force generating devices including a driven endless belt having weights located along a portion of its length.

4. A unidirectional force generator as defined in claim 1 further characterized by at least two other carriages supported for movement relative to said main frame along paths extending parallel to said given reference axis and which two other carriages are similar to said first two carriages except for being driven so as to operate at a different phase from said first two carriages.

5. A unidirectional force generator as defined in claim 1 further characterized by said means for controlling the movement of the two centrifugal force generating devices of each carriage relative to the main frame so as to operate in either a free mode or a power mode comprising for each centrifugal force generating device an elongated bar connected to the device and extending parallel to said reference axis, said bar having a plurality of notches along its length, a latch carried by said main frame and engageable with one of said notches to limit the movement of that device relative to the main frame, and means for selectively moving said latch into and out of engagement with said rod.

6. A unidirectional force generator as defined in claim 5 further characterized by said means for selectively moving each latch comprising a solenoid means operable to lift the latch out of engagement with said rod, and means for controlling the operation of said solenoids in synchronism with the movement of said carriages relative to said frame.

7. A unidirectional force generator as defined in claim 6 further characterized by said control means including a means for causing the solenoid means associated with one of said carriages to be operated to lift the associated latches out of engagement with the associated rods when the carriage moves forwardly.

8. A unidirectional force generator as defined in claim 5 further characterized by said means for selectively moving each latch comprising a slide movable between forward and rear positions relative to said main frame and operable in one of said positions to hold said latch out of engagement with said bar and in the other of said positions to allow said latch to engage said bar, and means on the associated one of said devices for moving said slide from its rear to its forward position when the carriage reaches the forward limit of its movement relative to said main frame and for moving said slide from its forward to its rear position when said carriage reaches the rear limit of its movement relative to said frame.

9. A unidirectional force generator as defined in claim 1 further characterized by said control means for controlling the movement of the two centrifugal force generating devices of each carriage relative to said main frame so as to operate in either a free mode or a power mode including for each of the two centrifugal force generating devices of each carriage an impact cam located ahead of that device, each of said impact cams being supported for rotation about an axis perpendicular to said reference axis, each of said impact cams having a plurality of impact faces located at successively increasing distances from the axis of cam rotation, and means for indexing said cams each time the associated centrifugal force generating device, when operating in said power mode, undergoes a rearward movement to bring a new impact face into alignment with it so that when the device next moves forwardly its forward movement will be restricted by such new impact face which is located further from the axis of cam rotation than the previous face.

10. A unidirectional force generator as defined in claim 9 further characterized by a motor, and a drive means between said motor and each of said centrifugal force generating devices for driving said devices from said motor, and said means for moving said cams including an indexing device connected between each cam and said motor for indexing each cam to bring a new impact face into alignment with the associated device while the device moves rearwardly.

11. A unidirectional force generator as defined in claim 9 further characterized by a motor, and a drive means between said motor and each of said centrifugal force generating devices for driving said devices from said motor, and said means for moving said cams including a drive means between said motor and each cam for rotating each cam continuously at such a speed as to bring a new impact face into alignment with the associated carriage between successive engagement of said carriage with the cam.

12. A unidirectional force generator as defined in claim 9 further characterized by another pair of impact cams associated with the two centrifugal force generating devices of each carriage, each of said other two impact cams being located behind one of said centrifugal force generating devices and carried by a weight slidably movable relative to said main frame through a spring means.

13. A unidirectional force generator as defined in claim 12 further characterized by means for adjusting the preload of the springs associated with said weights and for adjusting the position of said weight and spring means relative to said main frame.

14. A unidirectional force generator as defined in claim 1 further characterized by means for limiting the movement of the two centrifugal force generating devices of a carriage relative to said carriage.

15. A unidirectional force generator as defined in claim 1 further characterized by means for locking the two centrifugal force generating devices of a carriage against movement relative to said carriage during operation of said carriage in said free mode.

* * * * *